United States Patent
Mohr

(10) Patent No.: US 6,173,396 B1
(45) Date of Patent: Jan. 9, 2001

(54) CIRCUIT CONFIGURATION WITH A MICROPROCESSOR

(75) Inventor: Thomas Mohr, Buehl (DE)

(73) Assignee: Robert Bosch GmbH, Stuttgart (DE)

(*) Notice: Under 35 U.S.C. 154(b), the term of this patent shall be extended for 0 days.

(21) Appl. No.: 09/091,474

(22) PCT Filed: Jul. 27, 1997

(86) PCT No.: PCT/DE97/01533

§ 371 Date: Jan. 26, 1999

§ 102(e) Date: Jan. 26, 1999

(87) PCT Pub. No.: WO98/18072

PCT Pub. Date: Apr. 30, 1998

(30) Foreign Application Priority Data

Oct. 17, 1996 (DE) ............................................. 196 42 844

(51) Int. Cl.[7] ................................................. G06F 9/445
(52) U.S. Cl. ................................. 713/1; 710/262; 714/23
(58) Field of Search ................................. 713/1, 2, 100, 713/601; 710/261, 262, 263, 264, 266, 267, 269; 712/15, 224, 23, 24, 55; 395/575; 307/66; 377/31

(56) References Cited

U.S. PATENT DOCUMENTS

| | | | |
|---|---|---|---|
| 4,429,366 | * 1/1984 | Kennon | 364/482 |
| 4,520,418 | * 5/1985 | Susi | 361/92 |
| 4,638,428 | * 1/1987 | Gemma et al. | 364/200 |
| 4,788,661 | * 11/1988 | Morita | 364/900 |
| 4,807,141 | 2/1989 | Keine . | |
| 4,860,289 | * 8/1989 | Coulson | 371/12 |
| 5,054,448 | * 10/1991 | Matsuoka et al. | 123/425 |
| 5,157,270 | * 10/1992 | Sakai | 307/66 |
| 5,313,112 | * 5/1994 | Macks | 307/296.3 |
| 5,345,583 | * 9/1994 | Davis | 395/575 |
| 5,522,040 | * 5/1996 | Hofsass et al. | 714/55 |
| 5,704,034 | * 12/1997 | Circello | 714/38 |

FOREIGN PATENT DOCUMENTS

| | | |
|---|---|---|
| 43 02 232 | 8/1994 | (DE) . |
| 60-081651 | 5/1985 | (JP) . |
| 8-10867 | 4/1996 | (JP) . |

* cited by examiner

Primary Examiner—Thomas C. Lee
Assistant Examiner—Rijue Mai
(74) Attorney, Agent, or Firm—Kenyon & Kenyon

(57) ABSTRACT

A circuit arrangement having a microprocessor whose reset terminal is adapted to receive a reset signal from a driving circuit. A simple reset wiring of the microprocessor is implemented in that the reset terminal is additionally connected to a further terminal of the microprocessor which, after the reset terminal has received the reset signal, holds the reset terminal to a defined suppressing level that deviates from the reset level.

5 Claims, 1 Drawing Sheet

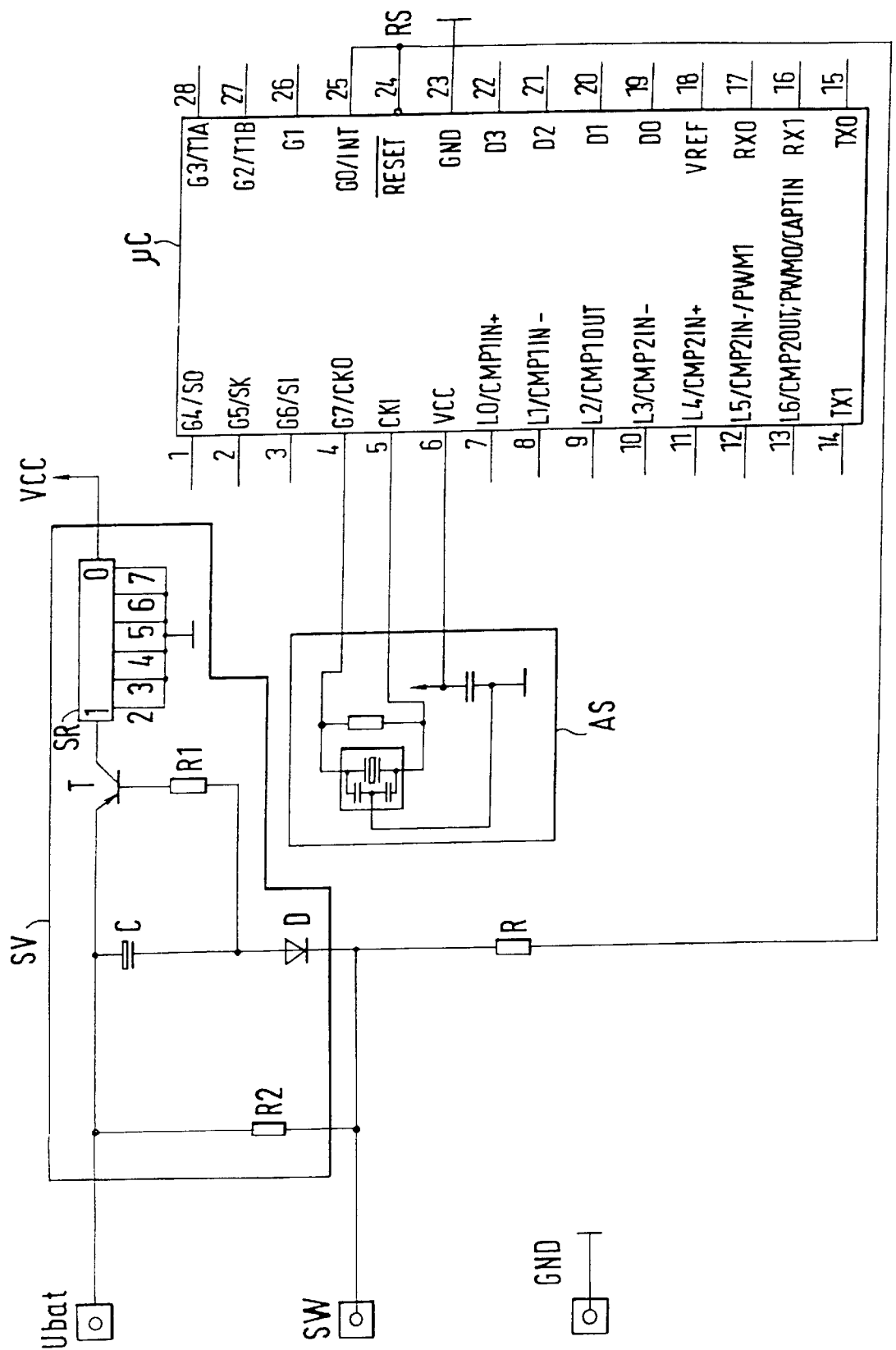

CIRCUIT CONFIGURATION WITH A MICROPROCESSOR

FIELD OF THE INVENTION

The present invention relates to a circuit arrangement having a microprocessor, whose reset terminal is adapted to receive a reset signal from a driving circuit.

BACKGROUND IMFORMATION

In conventional circuit arrangements which include a microprocessor, the driving circuit of the reset terminal of the microprocessor is implemented by a voltage regulator designed to emit the reset signal.

German Patent No. 43 02 232 describes a circuit arrangement which includes a microprocessor. A wake-up signal is periodically provided to bring a microprocessor, which is in an inactive state, into an active operating state. However, no further explanations regarding a driving circuit for a reset terminal are described in this publication.

SUMMARY OF THE INVENTION

An object of the present invention is to provided a circuit arrangement which will render possible a simple driving circuit.

In accordance with the present invention, the reset terminal is coupled to a further terminal of the microprocessor, which, after the reset terminal has received the reset signal, holds the reset terminal at a defined suppressing level that deviates from the reset level.

The present invention provides an arrangement in which an initial reset pulse effects the reset operation when the microprocessor is put into operation. After that, reset pulses are suppressed at the reset terminal. In this manner, a simple signal can be used that is present when the microprocessor is put into operation, at the reset instant, the signal assuming a level corresponding to the reset level, and after that being able to deviate from the reset level, without the need for costly wiring or a costly voltage regulator.

In one exemplary embodiment of the present invention, the additional terminal is held at the suppressing level by programming the microprocessor. After the microprocessor has left the reset state, following the change in the reset signal from the reset level, as one of the first commands to be executed, it sets the additional terminal, which is connected in parallel to the reset terminal, to the suppressing level, and holds it at this level during the processor's operating state, so that further reset signals are not able to appear at the reset terminal.

Provision can be made, for example, for the reset level to be the L-level (low level), and for the suppressing level to be the H-level (high level), and for the suppressing level to be maintained during the microprocessor's active state by internal protective structures of the microprocessor and by an external circuit element. In this manner, the suppressing level is maintained in a defined manner. Internal protective structures of this kind may be provide in which, for example, the additional terminal is connected to ground via a diode linked in blocking direction, and is connected to supply-voltage potential via another diode linked in the forward-conducting direction. The external circuit elements may include a simple resistor in a supply line of the reset signal.

One simple way to make the reset signal available is for the reset signal to be tapped off from a setpoint signal supplied by a control circuit, the setpoint signal also being used in a voltage-supply stage for reducing the closed-circuit quiescent current. Thus, the setpoint signal, i.e. the control circuit supplying it, is doubly utilized.

BRIEF DESCRIPTION OF THE DRAWING

The FIGURE illustrates a circuit arrangement including a microprocessor in accordance with an exemplary embodiment of the present invention.

DETAILED DESCRIPTION

The FIGURE shows a microprocessor $\mu C$ which has, inter alia, a reset terminal RESET, to which a further terminal GO of microprocessor $\mu C$ is connected in parallel. Another port terminal could also be connected in parallel to reset terminal RESET. Reset terminal RESET and further terminal GO are connected, via a resistor R of e.g. 100 kOhm, to a control circuit (not shown) that supplies a setpoint signal SW. Setpoint signal SW is fed to a voltage-supply stage SV which has a circuit stage including a switching transistor T, circuit resistors R1 and R2, a capacitor C and a diode D, as well as a voltage regulator SR which supplies a stabilized supply voltage VCC. The circuit stage is used to reduce the closed-circuit quiescent current, and is controlled by way of setpoint signal SW. Voltage-supply stage SV is supplied by a battery voltage Ubat. The common reference potential is GND.

A further circuit section AS, shown in the FIGURE, is conventional and therefore will not be discussed in more detail. Further circuit section AS is connected to microprocessor $\mu C$ in a conventional manner.

Reset signal RS, tapped off from setpoint signal SW via resistor R, resets microprocessor $\mu C$ when the L-level is reached, after microprocessor $\mu C$ has been put into operation through application of supply voltage VCC. If setpoint signal SW, and thus reset signal RS, then changes to the H-level, microprocessor $\mu C$ leaves the reset state and, as one of the first commands to be executed, sets terminal GO, connected in parallel to reset terminal RESET, to output H-level to reset terminal RESET. Consequently, a subsequent change in reset terminal RESET to the L-level is prevented, even if setpoint signal SW changes to the L-level, for example, to drive voltage-supply stage SV. That is, as long as terminal GO outputs H-level, a reset function is prevented by virtue of the H-level output by terminal GO and received by reset terminal RESET overriding any L-level setpoint signal SW. Therefore, a reliable reset function is implemented by the simple wiring configuration including resistor R, and a simple programming of microprocessor $\mu C$. As a result, for example, a simple, inexpensive voltage regulator can be used without power-on-reset.

What is claimed is:

1. A circuit arrangement, comprising:
   a microprocessor including a reset terminal and a second terminal, the reset terminal coupled to the second terminal and being adapted to receive a reset signal from a driving circuit, the reset signal having a reset level, the second terminal holding the reset terminal to a preselected suppressing level after the reset terminal has received the reset signal, the preselected suppressing level being different from the reset level.

2. The circuit arrangement according to claim 1, wherein the microprocessor is programmed to control the second terminal to hold the reset terminal to the preselected suppressing level.

3. The circuit arrangement according to claim 1, wherein the reset level is a low level, the preselected suppressing level is a high level, and the microprocessor includes an internal protective structure, the circuit arrangement further comprising:

an external circuit element, the preselected suppressing level being maintained by the external circuit element and the internal protective structure of the microprocessor.

4. The circuit arrangement according to claim 3, wherein the external circuit element includes a resistor in a supply line of the reset signal.

5. The circuit arrangement according to claim 1, wherein the reset signal is tapped off from a setpoint signal supplied by a control circuit, the setpoint signal being used in a voltage-supply stage for reducing a closed-circuit quiescent current.

* * * * *